United States Patent
Lee et al.

(10) Patent No.: US 9,609,209 B2
(45) Date of Patent: Mar. 28, 2017

(54) MOBILE TERMINAL AND METHOD OF CONTROLLING THE MOBILE TERMINAL

(71) Applicant: LG ELECTRONICS INC., Seoul (KR)

(72) Inventors: Haeju Lee, Seoul (KR); Jaemin Park, Seoul (KR); Yeongmi Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 414 days.

(21) Appl. No.: 14/227,123

(22) Filed: Mar. 27, 2014

(65) Prior Publication Data
US 2014/0375760 A1    Dec. 25, 2014

(30) Foreign Application Priority Data
Jun. 20, 2013  (KR) .................. 10-2013-0071169

(51) Int. Cl.
*H04N 5/232* (2006.01)
*G09G 5/34* (2006.01)

(52) U.S. Cl.
CPC ..... *H04N 5/23238* (2013.01); *H04N 5/23293* (2013.01); *G09G 5/34* (2013.01)

(58) Field of Classification Search
CPC ............. H04N 5/23238; H04N 5/2258; H04N 5/23229; H04N 2013/0088; G06T 2207/20221; G06T 11/60
See application file for complete search history.

(56) References Cited

U.S. PATENT DOCUMENTS 6,389,179 B1   5/2002  Katayama et al. ........... 382/284
7,456,864 B2   11/2008  Soga
(Continued)

FOREIGN PATENT DOCUMENTS

CN    101399879    4/2009
CN    103139465    6/2013
(Continued)

OTHER PUBLICATIONS

The extended European Search Report issued in Application No. 14162585.5 dated Mar. 11, 2015.
(Continued)

*Primary Examiner* — Obafemi Sosanya
(74) *Attorney, Agent, or Firm* — Ked & Associates, LLP

(57) ABSTRACT

Provided is a mobile terminal including a main body, first and second cameras that are arranged on the front and rear sides of the main body, respectively, a sensing unit that senses the extent to which the main body moves when driving the first and second cameras, and a controller that when a panorama photographing mode is selected, drives the first and second cameras at the same time in such a manner that the first and second cameras capture their respective images depending on movement of the main body, and when the extent of the sensed movement of the main body falls out of a reference range, stops photographing and connects first images captured by the first camera and second images captured by the second camera to generate at least one panorama picture. The rotation of the main body within a reference range enables a panorama picture to be generated.

17 Claims, 15 Drawing Sheets

(56) References Cited

U.S. PATENT DOCUMENTS

| | | | |
|---|---|---|---|
| 9,332,167 B1* | 5/2016 | Pance | H04N 5/2258 |
| 2005/0237383 A1 | 10/2005 | Soga | 348/36 |
| 2011/0285810 A1 | 11/2011 | Wagner et al. | |
| 2013/0094780 A1* | 4/2013 | Tang | G06T 11/60 |
| | | | 382/284 |
| 2013/0303247 A1* | 11/2013 | Wu | A63F 13/005 |
| | | | 463/5 |

FOREIGN PATENT DOCUMENTS

| | | |
|---|---|---|
| EP | 1 548 644 A1 | 6/2005 |
| JP | 2009-89331 A | 4/2009 |
| WO | WO 2013/069047 A1 | 5/2013 |

OTHER PUBLICATIONS

European Search Report issued in application No. 14162585.5 dated Oct. 29, 2014.
Chinese Office Action dated Dec. 28, 2016 issued in Application No. 201410263750.8 (English translation attached).

* cited by examiner

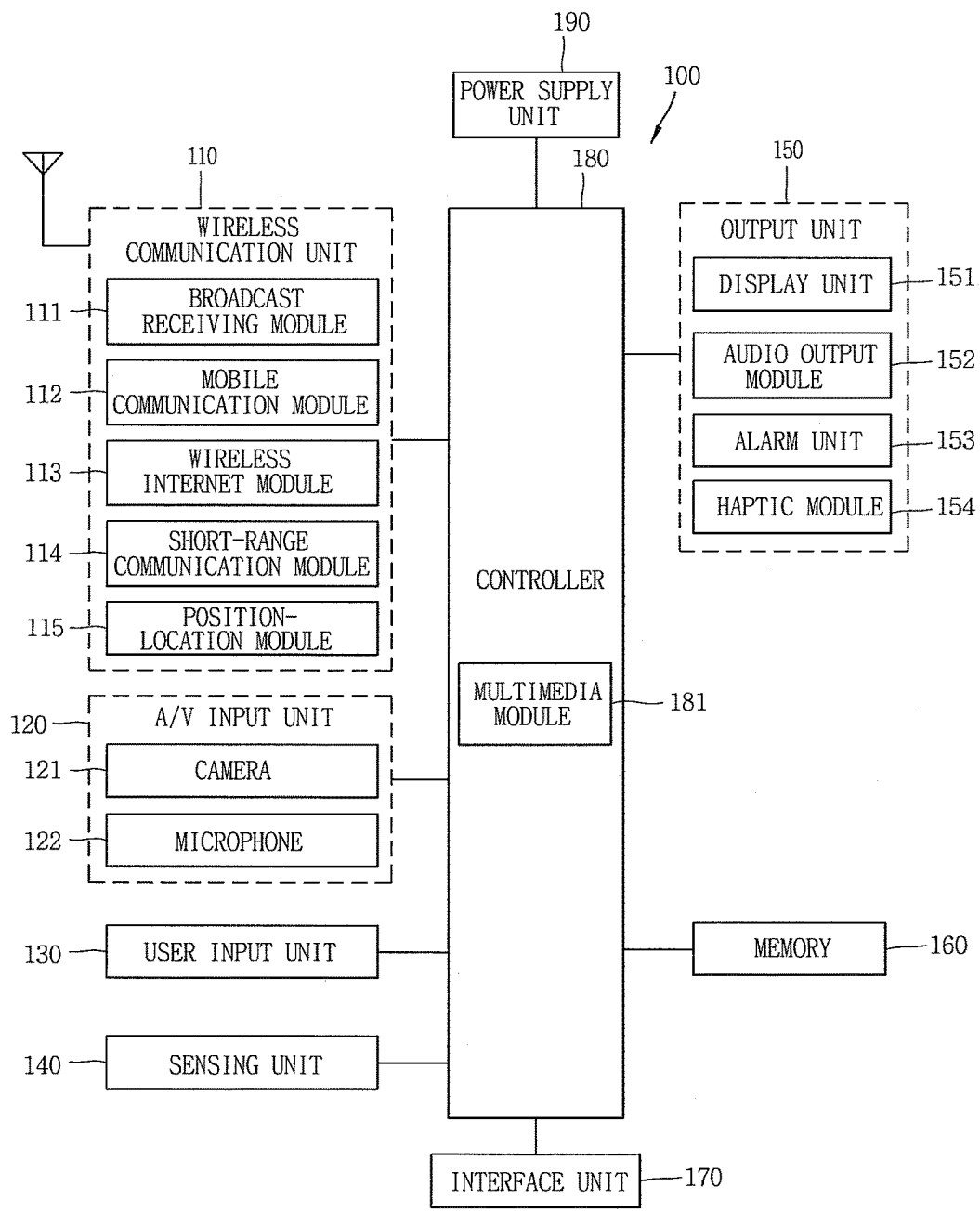

FIG. 10B
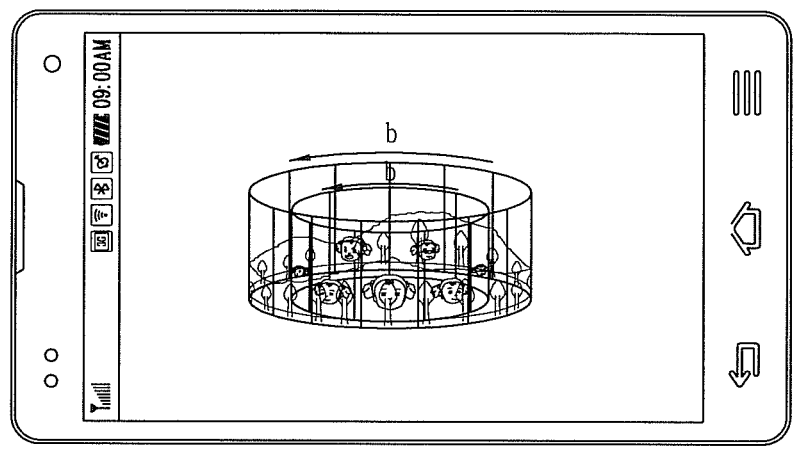
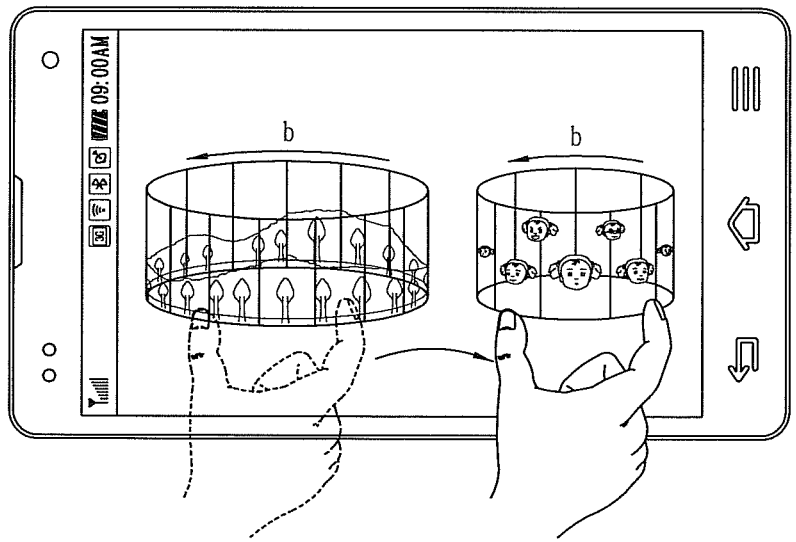

MOBILE TERMINAL AND METHOD OF CONTROLLING THE MOBILE TERMINAL

CROSS-REFERENCE TO RELATED APPLICATION

Pursuant to 35 U.S.C. §119(a), this application claims the benefit of earlier filing date and right of priority to Korean Application No. 10-2013-0071169, filed on Jun. 20, 2013, the contents of which is incorporated by reference herein in its entirety.

BACKGROUND

1. Field

The present disclosure relates to a mobile terminal and a method of controlling the mobile terminal and more particularly to a mobile terminal that is capable of performing panorama photographing using a camera provided in a main body thereof and a method of controlling the mobile terminal.

2. Background

An electronic device includes a mobile terminal such as a portable phone, a smart phone, a laptop computer, a digital broadcasting terminal, a personal digital assistant (PDA), a portable multimedia player (PMP) and a navigator, and a fixed terminal such as a digital TV and a desktop computer.

As functions of the electronic device become more diversified, the electronic device can support more complicated functions such as capturing images or video, reproducing music or video files, playing games and receiving broadcast signals. By comprehensively and collectively implementing such functions, the electronic device may be embodied in the form of a multimedia player or a device. Various attempts have been made to implement complicated functions in such a multimedia device by means of hardware or software.

On the other hand, the mobile terminal is equipped with a panorama photographing function. By executing the panorama photographing function of the mobile terminal, the user can obtain a panorama picture that results from connecting individually-captured images in a leftward/rightward direction or in a upward/downward direction and thus is longer in the leftward/rightward direction or in the upward/downward direction than a normal picture.

In recent years, a 360-degrees panorama picture has been achieved increasing popularity. In the 360-degrees panorama picture, a part where photographing starts is the same as a part where the photographing ends. When the camera provided in the mobile terminal captures images for the 360-degrees panorama picture, the user has to rotate the main body of the mobile terminal by 360 degrees. However, there is an inconvenience in that it is not easy for the user to rotate the main body by 360 degrees with his/her hand. Furthermore, if when capturing surrounding landscape images for the 360-degrees panorama picture with the camera, the user wants to include images of a facial expression of him/her who views the landscape, in the 360-degrees panorama picture, he/she experiences inconvenience in that the images of the facial expression has to be captured and then combined.

The above references are incorporated by reference herein where appropriate for appropriate teachings of additional or alternative details, features and/or technical background.

SUMMARY OF THE DISCLOSURE

Therefore, an aspect of the detailed description is to provide a mobile terminal that is capable of concurrently capturing surrounding landscape images and images of a facial expression of a user who views the surrounding landscape without rotating a main body of the mobile terminal by 360 degrees when capturing the images for a 360-degrees panorama picture with cameras provided on the mobile terminal and a method of controlling the mobile terminal.

Another aspect of the detailed description is to provide a mobile terminal that is capable of displaying at least one 360-degrees panorama picture into which captured images are combined, in an easy-to-view manner, and of easily controlling the displayed panorama picture and a method of controlling the mobile terminal.

To achieve these and other advantages and in accordance with the purpose of this specification, as embodied and broadly described herein, there is provided a mobile terminal including a main body, first and second cameras that are arranged on the front and rear sides of the main body, respectively, a sensing unit that senses the extent to which the main body moves when driving the first and second cameras, and a controller that when a panorama photographing mode is selected, drives the first and second cameras at the same time in such a manner that the first and second cameras capture their respective images depending on movement of the main body, and when the extent of the sensed movement of the main body falls out of a reference range, stops photographing and connects first images captured by the first camera and second images captured by the second camera to generate at least one panorama picture.

In the mobile terminal, when an initial image and a current image that the first and second cameras capture, respectively, depending on the movement of the main body, overlap each other, the controller may stop driving the first and second cameras and connects the first images and the second images to generate the at least one panorama picture.

In the mobile terminal of claim, when a user image extraction function is selected, the controller may remove a user image included in the generated panorama picture and may extract a landscape image, which is hidden by the removed user image, from a preceding image and a following image that are connected, and perform combining with the extracted landscape image.

In the mobile terminal, when the panorama photographing mode is selected, the controller may record a sound signal that is input a microphone of the main body, until the driving of the first and second cameras is stopped.

In the mobile terminal, when the panorama photographing mode is selected, the sensing unit may sense the movement of the main body, and when a rotation angle of the main body exceeds a reference angle, the controller may stop driving the first and second cameras and connect the first images and the second images to generate the at least one panorama picture.

In the mobile terminal, when the panorama photographing mode is selected, the sensing unit may sense the movement of the main body in a circular motion with a user serving as a central axis, and when an angle at the center of a circle according to the movement of the main body exceeds a reference angle, the controller may stop driving the first and second cameras and may connect the first images captured by the first camera to generate a first panorama picture and connect the second images captured by the second camera to generate a second panorama picture.

In the mobile terminal, when the panorama photographing mode is selected, the controller may enter a preview screen of the first camera and display a frame for guiding a user image in such a manner that the user image is positioned on a predetermined region, on the review screen.

In the mobile terminal, the controller may connect the user images within the frame, captured by the first camera to generate the first panorama picture and combine images outside of the frame, captured by the first camera, and background images captured by the second camera to generate the second panorama picture.

In the mobile terminal, the controller may display time information, and positional and direction information that are obtained while the first and second cameras capture their respective images depending on the movement of the main body, on the first and second images in such a manner as to overlap the first and second images.

The mobile terminal may further include a display unit to which the generated panorama picture is output, in which, based on an user input, the controller may control the display unit in such a manner that the generated panorama picture is output as a two-dimensional picture in a predetermined shape or a three-dimensional picture in a predetermined shape.

In the mobile terminal, when in a state where the panorama picture is output as the two-dimensional picture to the display unit, a first touch input is detected, the controller may change the panorama picture to the three-dimensional picture in the predetermined shape and outputs the resulting three-dimensional picture and when in a state where the panorama picture is output as the three-dimensional picture to the display unit, a second touch input is detected, the controller may change the panorama picture to the two-dimensional picture in the predetermined shape and outputs the resulting two-dimensional picture.

In the mobile terminal, in a state where the panorama picture is output to the display unit, the sensing unit additionally senses an inclination of the main body, and the controller may rotate the panorama picture according to a direction of the sensed inclination.

In the mobile terminal, when in a state where the panorama picture is output to the display unit, a touch input in one direction is sensed on the panorama picture, the controller may rotate the panorama picture at a speed corresponding to strength of the touch input according to the sensed touch input.

In the mobile terminal, when in a state where the panorama picture is output to the display unit, a reproduction function is selected, the controller may rotate the panorama picture in one direction and may additionally output a sound corresponding to the panorama picture at the same time until the image that is currently output to the display unit appears again.

In the mobile terminal, when the reproduction function is selected with respect to the first panorama picture, the controller may rotate the second panorama picture in such a manner that the second panorama picture corresponds to a current image, a rotational direction and a rotational speed.

In the mobile terminal, the displaying unit may be divided into a first region and a second region and the controller may output a first panorama picture generated by connecting user images captured by the first camera to the first region, and output a second panorama picture generated by connecting background images captured by the first and second cameras to the second region.

In the mobile terminal, the controller may output the first panorama picture as a two-dimensional picture or a three-dimensional picture and output the second panorama picture as the three-dimensional picture to the second region.

In the mobile terminal, in response to a gesture input in which the first panorama picture is pushed down and then is dragged to the second panorama picture, the controller may perform control in such a manner that the second panorama picture is output in such a manner that the second panorama picture is enlarged to an entire screen and may perform the control in such a manner that the first panorama picture is output in such a manner that the first panorama picture is positioned within the second panorama picture.

In the mobile terminal, in response to a gesture input in which the first panorama picture is pulled out of the second panorama picture within which the first panorama picture is positioned, the controller may output the second panorama picture in such a manner that the second panorama picture is reduced in size and output the first panorama picture in such a manner that the first panorama picture is moved to a region corresponding to the gesture input.

To achieve these and other advantages and in accordance with the purpose of this specification, as embodied and broadly described herein, there is provided a method of controlling a mobile terminal equipped with first and second cameras arranged on the front and sides of a main body thereof, including driving the first and second cameras at the same time in order for the first and second cameras to capture their respective images depending on the main body when selecting a panorama photographing mode, stopping the driving of the first and second cameras when an initial image captured by the first camera and a current image captured by the second camera overlap each other, and connecting first image captured by the first camera and second images captured by the second camera to generate at least one panorama picture.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 1 is a block diagram illustrating a mobile terminal according to one embodiment of the present disclosure;

FIGS. 10A to 10B are diagrams for describing a method in which a way to display the multiple panorama pictures is changed through a user gesture input according to one embodiment of the present disclosure.

DETAILED DESCRIPTION

Figure 2A:
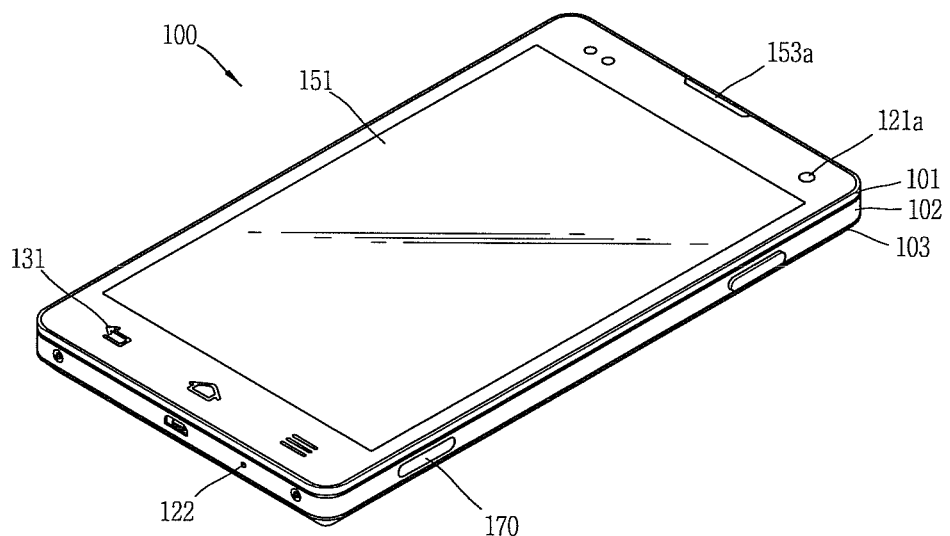
FIGS. 2A and 2B are perspective views illustrating one example of the mobile terminal according to one embodiment of the present disclosure when viewed from the front side and the rear side, respectively.

Hereinafter, the present disclosure will be explained in more detail with reference to the attached drawings. For the sake of brief description with reference to the drawings, the same or equivalent components will be provided with the same reference numbers, and description thereof will not be repeated. The suffixes "module" and "unit or portion" for components used in the following description merely provided only for facilitation of preparing this specification, and thus they are not granted a specific meaning or function. If it is regarded that detailed descriptions of the related art are not within the range of the present disclosure, the detailed descriptions will be omitted. Furthermore, it should also be understood that embodiments are not limited by any of the details of the foregoing description, but rather should be construed broadly within its spirit and scope and it is intended that the present disclosure cover modifications and variations of this disclosure provided they come within the scope of the appended claims and their equivalents.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC and an ultra book. However, it will be obvious to those skilled in the art that the present disclosure may be also applicable to a fixed terminal such as a digital TV and a desktop computer, except for specific configurations for mobility.

FIG. 1 is a block diagram of a mobile terminal according to an embodiment of the present disclosure.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views another party, whereas the voice call mode indicates a call performed while a user does not view another party. For implementation of the video call mode and the voice call mode, the mobile communication module 112 is configured to transceive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 123. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110.

The microphone 123 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 123 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or a capturing mode, the display unit 151 may display a captured and/or received image or a GUI or a UI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit (not shown) and an internal display unit (not shown). The touch screen may be configured to detect a touch input pressure as well as a touch input location and a touch input area.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. Such video signal or audio signal may be output through the display unit 151 or the audio output module 152. Accordingly, the display unit 151 or the audio output module 152 may be categorized into part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are inputted or outputted. The memory 160 may store therein data on vibrations and sounds of various patterns output when a touch is input onto the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. And, the controller 180 can control a locked screen displayed in the locked state, based on a touch input sensed by the display unit (hereinafter, will be referred to as 'touch screen' 151) in the locked state.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present disclosure will be explained.

Figure 2B:
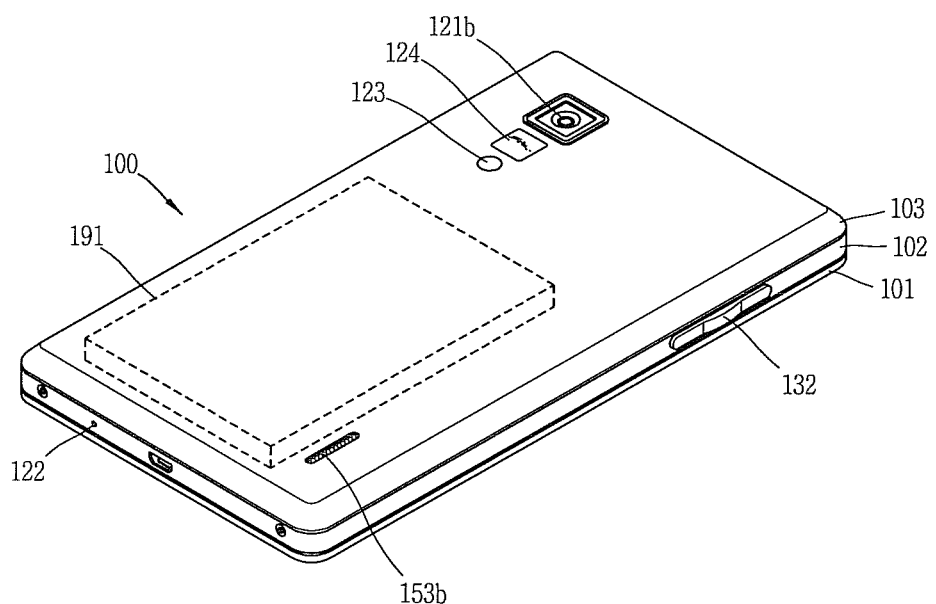

FIG. 2A is a front perspective view of the mobile terminal according to an embodiment of the present disclosure, and FIG. 2B is a rear perspective view of the mobile terminal according to an embodiment of the present disclosure The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction.

A case (casing, housing, cover, etc.) forming an outer appearance of the body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, user input units 130/131 and 132, a microphone 123, an interface unit 170, etc.

The display unit 151 occupies most parts of a main surface of the front case 101. The audio output unit 152 and the camera 121 are arranged at a region adjacent to one end of the stereoscopic display unit 151, and the user input unit 131 and the microphone 123 are arranged at a region adjacent to another end of the display unit 152. The user input unit 131, the interface unit 170, etc. may be arranged on side surfaces of the front case 101 and the rear case 102. On the other hand, the microphone 123 is arranged at another end of the body.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151, the touch pad 135 may be formed to be light-transmissive. In this case, if the display unit 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A camera 122 may be additionally provided on the rear case 102. The camera 122 faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 122 may operate with a relatively higher pixels (higher resolution) such that it can be useful for a user to obtain higher quality pictures for later use. The cameras 121 and 122 may be installed at the body 100 so as to rotate or pop-up.

A flash 123 and a mirror 124 may be additionally disposed close to the camera 122. The flash 123 operates in conjunction with the camera 122 when taking a picture using the camera 122. The mirror 124 can cooperate with the camera 122 to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display unit 151 of the front case 101. The touch pad 135 may be disposed on the rear surface of the display unit 151 in parallel. The touch pad 135 may have a size equal to or smaller than that of the display unit 151.

The mobile terminal 100 according to an embodiment of the present disclosure, including at least one or more of the constituent elements described above, includes first and second cameras 121 and 122 on front and rear sides of a main body thereof, respectively. When a panorama photographing mode is selected through a user input, the controller 180 drives the first and second cameras 121 and 122 at the same time in such a manner that the first and second cameras 121 and 122 capture their respective images, depending on movement of the main body. In the panorama photographing mode, the extent to which the main body moves is sensed. When the extent falls out of a predetermined reference range, the photographing is ended, and at least one panorama picture is generated by combining first and second images captured by the first and second cameras 121 and 122, respectively.

The predetermined reference range here means a range in which the photographing takes place until an initial image captured by the first camera 121 and a current image captured by the second camera 122 overlap each other.

When the panorama photographing mode is selected, if in the 360-degrees panorama photographing mode, the user rotates the main body about an rotation axis, although because the first camera 121 and the second camera 122 are present in opposite positions, the main body rotates only by 180 degrees, a point at which the first camera 121 starts the photographing or a user gaze direction and a point at which the second camera 122 is currently performing the photographing or the user gaze direction are consistent with each other. Therefore, when in the 360-degrees panorama photographing mode, a rotation angle at which the main body rotates exceeds 180 degrees, the images captured by the first camera 121 and the images captured by the second camera 122 are combined to obtain a 360-degrees panorama picture.

When the panorama photograph mode is selected in this manner, according to embodiments of the present disclosure, the 360-degrees panorama photographing is possible by driving the cameras arranged in the front and rear sides of the mobile terminal at the same time and rotating the main body only within the predetermined range. Thus, a surrounding landscape and a facial expression of the user who views the surrounding landscape are captured into the panorama picture at the same time.

Figure 3:
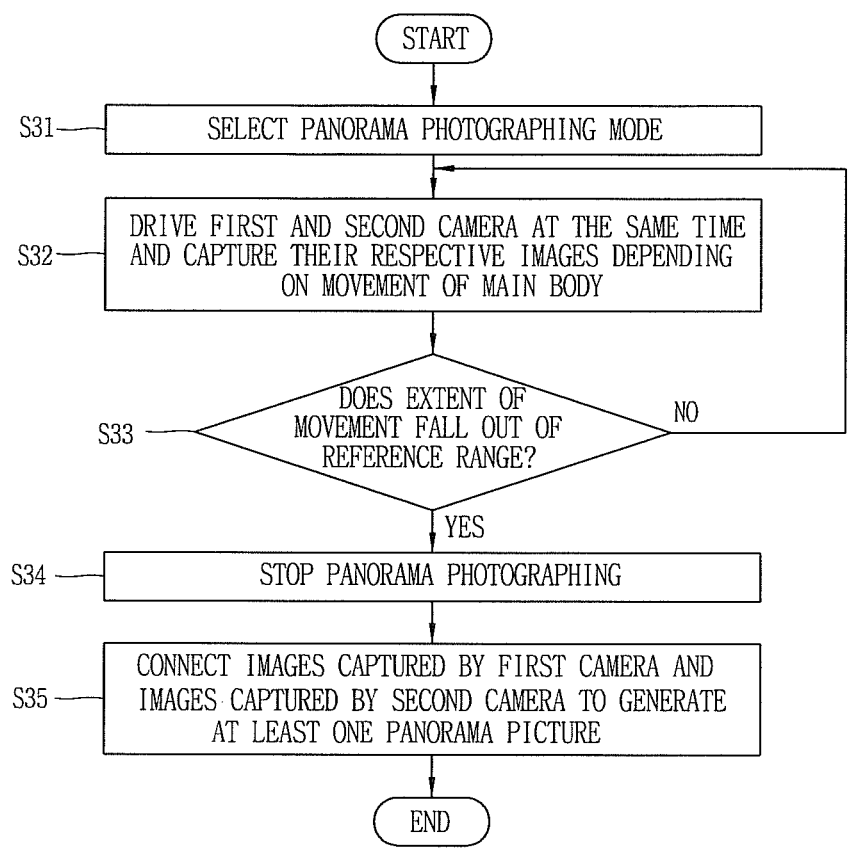
FIG. 3 is an exemplary flowchart illustrating a method of controlling the mobile terminal according to one embodiment of the present disclosure.
Figure 4A:
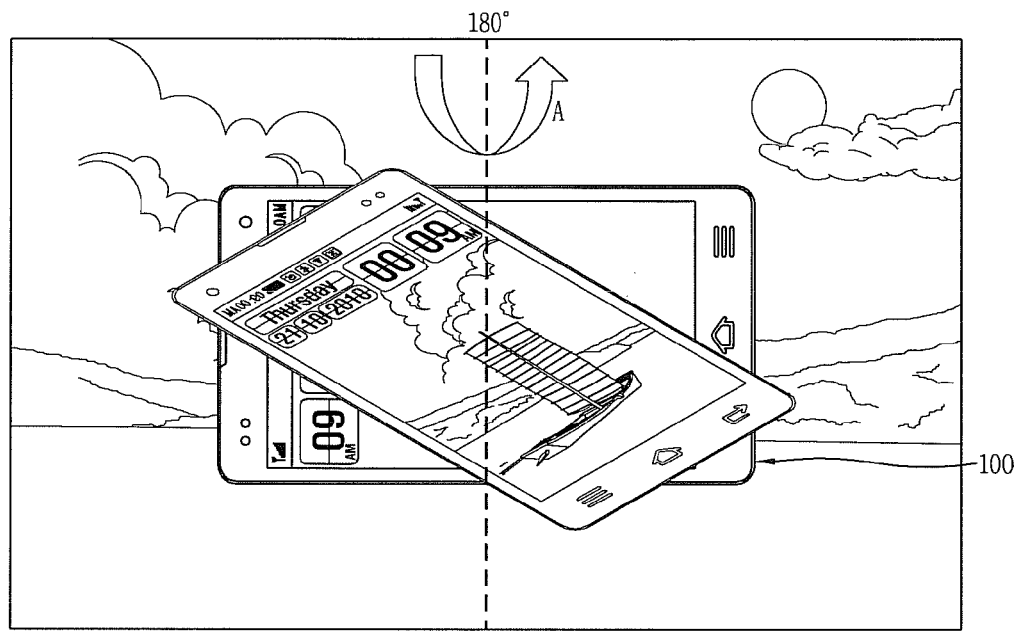
FIGS. 4A to 4C are diagrams for describing the control method in FIG. 3.
Figure 4B:
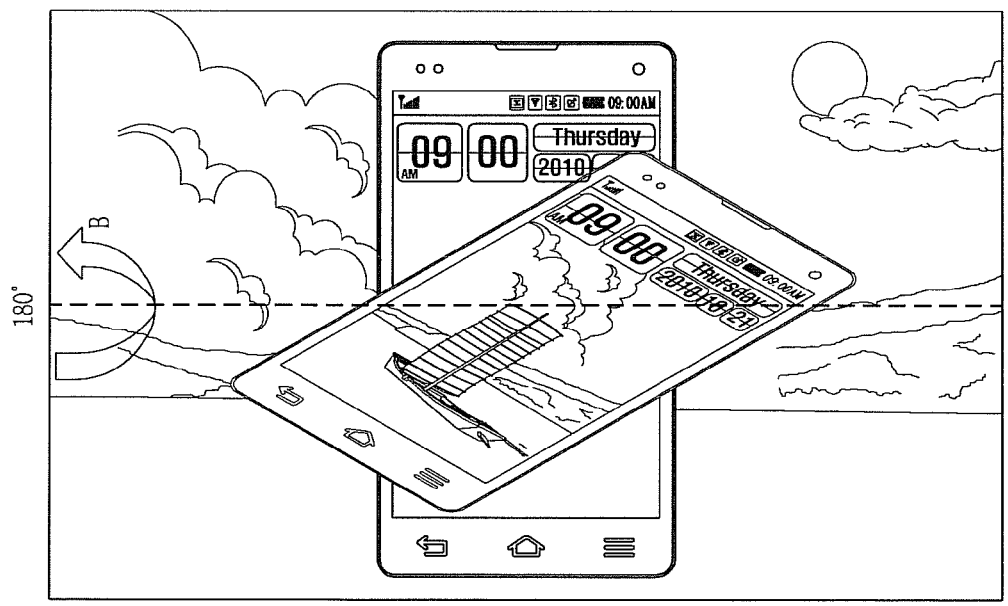
Figure 4C:
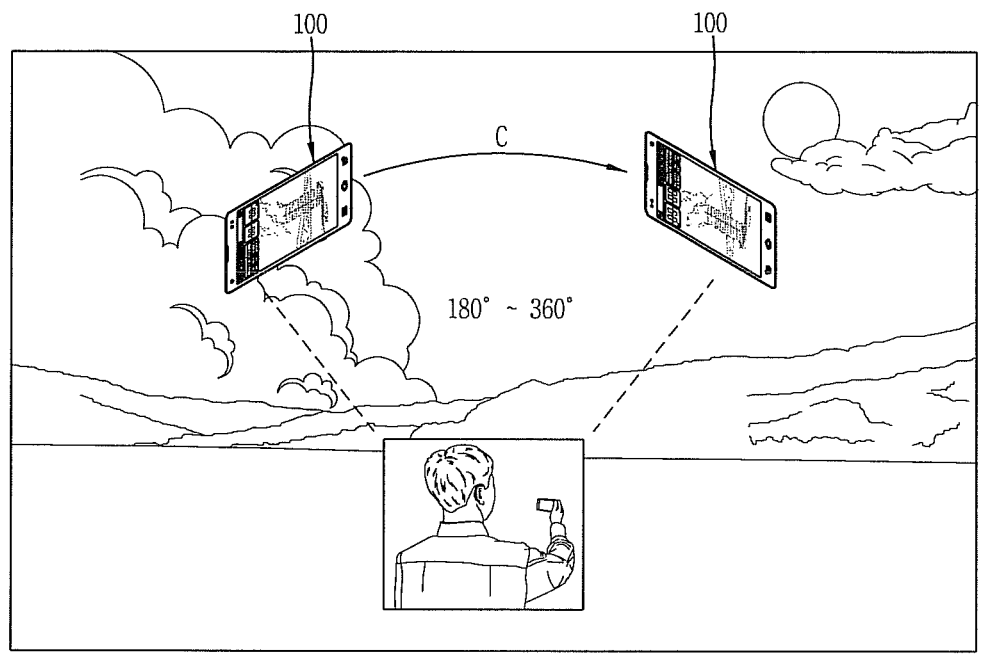

A method of generating the panorama picture using the mobile terminal according to the embodiment of the present disclosure is described in detail below referring to FIG. 1, FIG. 3 and FIGS. 4A to 4C. In association with this, FIG. 3 is an exemplary flowchart illustrating a method of controlling the mobile terminal according to one embodiment of the present disclosure. In addition, FIGS. 4A to 4C are diagrams for describing the control method in FIG. 3.

First, the first and second cameras are assumed to be arranged on the front and rear sides of the main body of the mobile terminal 100.

Referring to FIG. 3, when the panorama photographing mode is selected through the user input and the like (S31), the controller 180 drives the first and second cameras 121 and 122 at the same time in such a manner that the first and second cameras capture their respective images, depending on the movement of the main body (S32). For example, the first camera 121 arranged on the front side of the main body captures a user image that changes over time and background images the changes depending on the movement of the main body, and the second camera 122 arranged on the rear side of the main body captures only the background images that changes depending on the movement of the main body.

At this point, if the first and second cameras 121 and 122 are different in resolution capability from each other, the resolution of the camera with higher resolution capability is adjusted to that of the camera with lower resolution capability. That is, the resolution of any one of the cameras is changed. After this adjustment, the panorama photographing is performed.

In the panorama photographing mode, the sensing unit 140 senses the movement of the main body. Specifically the sensing unit 140 senses that the main body rotates about a central axis of the main body. In addition, the sensing unit 140 senses that the main body moves in a circular motion with the user serving as a central axis.

For example, FIGS. 4A and 4B illustrate that the user rotates the main body about the central axis of the main body in the leftward/rightward direction (e.g., horizontal direction) and in the upward/downward direction (e.g., vertical direction), respectively. FIG. 4C illustrates that the user gripping the main body moves the main body in a circular motion within a range of 180° to 360 degrees in the leftward/rightward direction (e.g., horizontal direction) with his/her serving as a central axis.

In the panorama photographing mode, the controller 180 determines whether the extent to which the main body moves falls out of the range (S33).

For example, if the panorama photographing mode is for the 360-degrees panorama photographing, when the initial image captured by the first camera 121 and the current image captured by the second camera 122 overlap each other, the controller 180 determines that the extent to which the main body moves falls out of the predetermined reference range.

When it is determined that the extent to which the main body moves falls out of the reference range, the controller 180 stops driving the first and second cameras, thereby ending the panorama photographing (S34).

Thereafter, the images captured by the first camera 121 and the images captured by the second camera 122 are connected (or combined) to generate at least one panorama picture (S35).

Specifically, in the case of performing the photographing while rotating the main body from the leftward/rightward direction and the upward/downward directions, when the rotation angle of the main body exceeds a reference angle, the controller 180 stops driving the first and second cameras and connects a starting point of the first image captured by the first camera and an ending point of the second image captured by the second camera to generate one 360-degrees panorama picture.

For example, as illustrated in FIGS. 4A and 4B, the controller 180 combines the images that the first camera 121 arranged on the front side of the main body captures while rotating in the left-to-right direction (in the A-direction in FIG. 4A) (or in the right-to-left direction) or in the top-do-down direction (in the B-direction in FIG. 4B) (or in the down-to-top direction) (rotating in a range of 0 to 180 degrees) and the images, different from those captured by the first camera, which the second camera 122 arranged on the rear side of the main body captures while rotating by 180 degrees in the same direction (rotating in a range of 180 degrees to 360 degrees) to obtain one 360-degrees panorama picture.

At this point, the user image (or a different specific object) included in the images that the first camera 121 and/or the second camera 122 capture while rotating can be deleted as described below.

In the case of performing the panorama photographing while the main body of the mobile terminal moves in a circular motion in the leftward/rightward direction with the user serving as a reference axis, when an angle at the center of a circle according to the movement of the main body exceeds the reference angle (for example, 180 degrees or 360 degrees), the controller 180 stops driving the first and second cameras and connects the images captured by the first camera 121 to generate a first panorama picture and connects the images captured by the second camera 122 to generate a second panorama picture.

For example, as illustrated in FIG. 4C, in response to the rotation of the main body of the mobile terminal by 360 degrees or 180 degrees in the left-to-right direction (in the C-direction in FIG. 4C) (or in the right-to-left direction) with the user serving as the reference axis, the controller 180 obtains the first 360-degrees panorama picture (or the first 360-degrees panorama picture) into which an image of changes in the facial expression of the user and a background image that are captured by the first camera 121 are connected and obtains the second 360-degrees panorama picture into which the landscape images captured by the second camera 122 are connected (or the 360-degrees panorama picture into which the background image captured by the first camera 121 and the landscape image captured by the second camera 122 are connected).

In addition, in the case of performing the photographing while rotating the main body in the leftward/rightward and upward/downward directions or moving the main body in a circular motion with the user serving as the reference axis, the 360-degrees panorama picture that is rotatable in the leftward/rightward direction and in the upward/downward direction can be obtained by combining the image captured while rotating the main body in the leftward/rightward direction and the image captured while rotating the main body in the upward/downward direction.

While performing the panorama photographing, the controller 180 records a sound signal that is input through the microphone 123 before stopping driving the first and second cameras 121 and 122. The recorded sound signal is stored along with the captured images in the panorama picture and when the panorama picture is output or is reproduced, is output in synchronization with the panorama picture.

In addition, while performing the panorama photographing, that is, while the first and second cameras 121 and 122 capture their respective images depending on the movement of the main body, the controller 180 displays time information, location information, and compass direction information in such a manner as to overlap the captured images.

Figure 7A:
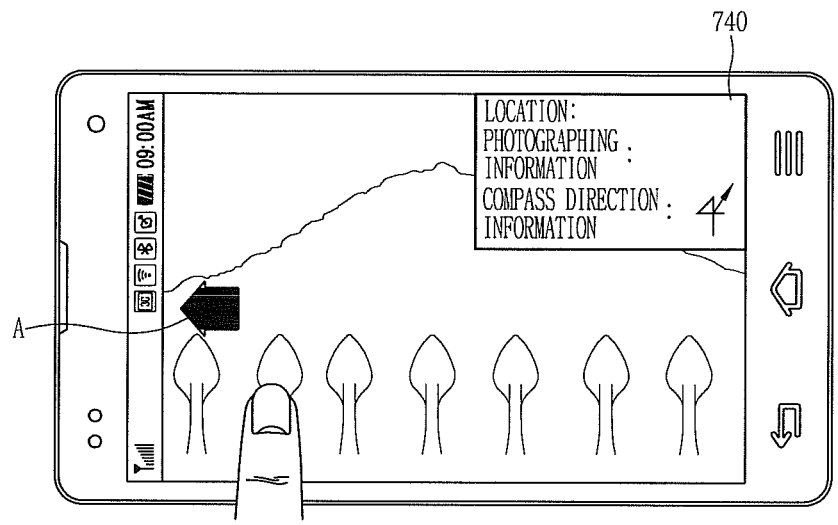
FIGS. 7A to 7C are diagrams for describing methods in each of which a 360-degrees panorama picture generated according to one embodiment of the present disclosure is output to a screen.

For example, referring to FIG. 7A, if the 360-degrees panorama picture generated according to the embodiment of the present disclosure rotates according to a user gesture input, an indicator 740, which indicates the location information, photographing time, and the compass direction information that relate to the corresponding image included at the time of the panorama photographing, is displayed in the form of text or in the form of a graphic image on one region of the display unit 151.

On the other hand, when it is determined in Step S33 that the extent to which the main body moves falls within the reference range, Step S32 is executed, that is, the first and second cameras 121 and 122 continue to be driven at the same time to capture their respective images depending on the movement of the main body, until a forced ending input is applied.

As described above, the mobile terminal according to the embodiment of the present disclosure generates at least one 360-degrees panorama picture by driving the cameras arranged on the front and rear sides of the main body and thus rotating the main body only within the predetermined range.

A method is described below in which when according to the present disclosure the 360-degrees panorama photographing is performed using the camera provided in the mobile terminal, the panorama picture is generated in such a manner that a specific object, for example, the user image, is removed to make the hidden landscape image appear.

Figure 5:
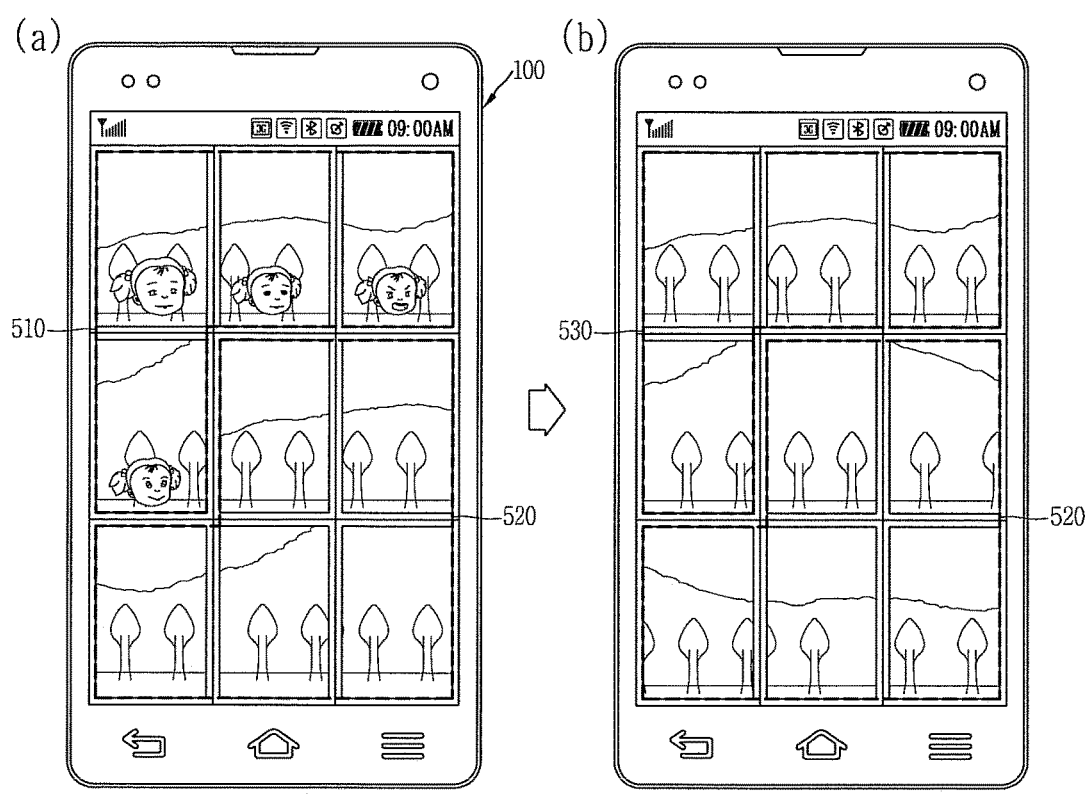
FIG. 5 shows diagrams for describing a method in which a panorama picture from which a specific object that is included when the panorama photographing is performed according to one embodiment of the present disclosure is removed is generated.

In association with this, FIG. 5 shows diagrams for describing the method in which the panorama picture from which the specific object that is included when the panorama photographing is performed according to one embodiment of the present disclosure is removed is generated.

When the panorama photographing mode is selected through the user input and the like, the controller 180 drives the first and second cameras 121 and 122 at the same time in such a manner that the first and second cameras capture their respective images, depending on the movement of the main body. In the panorama photographing mode, the sensing unit 140 senses the movement of the main body, and the controller 180 determines whether the extent to which the main body moves falls out of the predetermined reference range. When the extent to which the main body moves falls out of the reference range, that is, when the initial image captured by the first camera 121 and the current image captured by the second camera 122 overlap each other, the controller 180 stops driving the first and second cameras and connects (combines) the images captured by the first camera 121 and the images captured by the second camera 122.

At this point, when a user image extraction function is selected through the user input unit 130, the controller 180 extracts and removes the user image included in the connected images. Then, the controller 180 extracts the landscape image hidden by the removed user image from the preceding image and the following image and performs combining with the extracted landscape image.

To do this, the controller 180 estimates the landscape image hidden by the user image by matching the current image from which the user image is extracted, with the images that are captured before and after the current image (if necessary, possibly with the multiple images that are captured before the current image and with the multiple images that are captured after the current image)

For example, referring to FIGS. 5A and 5B, first images 510, which are captured by the first camera and second images 520 captured by the second camera are arranged in parallel. At this point, if the user image is included in the images 510 captured by the first camera 121, (for example, if the panorama photographing is performed while moving the main body in a circular motion with the user serving as the axis), the user image extraction function is assumed to be selected.

Then, the controller 180 removes the user image included in the first image 511 and estimates the landscape image corresponding to the removed image with the second image 512 (the following image) and the last image 525 (the preceding image). In this manner, the landscape image corresponding to the user image included in the fourth image 514 is estimated with the third image 513 and with the first image 521 captured by the second camera 122.

In this manner, the images 530 from which the user images are removed are temporarily stored the memory (not illustrated) and are connected to the second images 520 captured by the second camera 122 and are output as one panorama picture.

In addition, if the panorama picture in which the removed image is restored is desired, through the user input, the controller 180 generates the desired panorama picture by connecting the images that are present before the pre-stored user image are removed and the images in which the user images are not present.

On the other hand, in another example, a different object (for example, an animal, a rock, and others included in the landscape), not the user image, can be removed.

Specifically, for example, when the images captured by the multiple cameras 121 and 122 are displayed in parallel on the display unit 151 and in a state where the user touches on a specific image among those image and thus the corresponding image is displayed in an enlarged manner, a touch and drag (not limited to this) is input in a looped-circle motion along a boundary line of a specific image to desirably be removed, the controller 180 extracts the corresponding specific image from different images as well.

By doing this, the user obtains the panorama picture from which the images undesirably included at the time of the panorama photographing are deleted at a time.

Figure 6A:
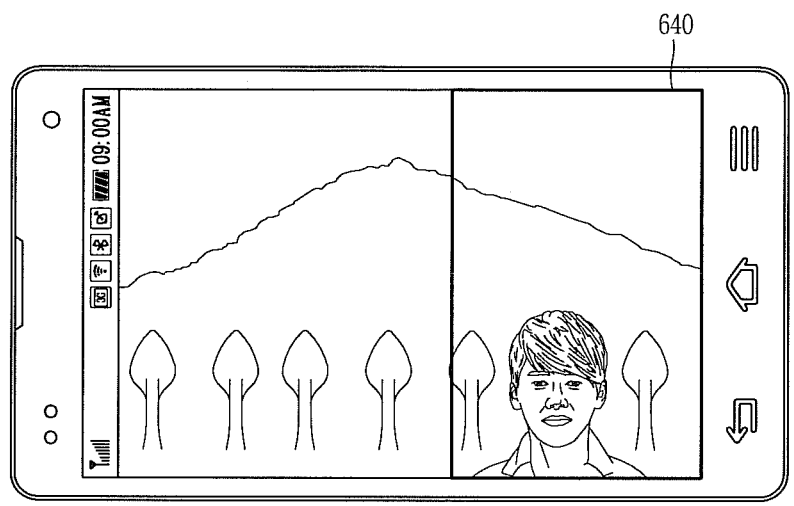
FIGS. 6A to 6C are diagrams for describing a method in which the multiple panorama pictures are generated at the same time by moving a main body only within a predetermined reference range according to one embodiment of the present disclosure.
Figure 6B:
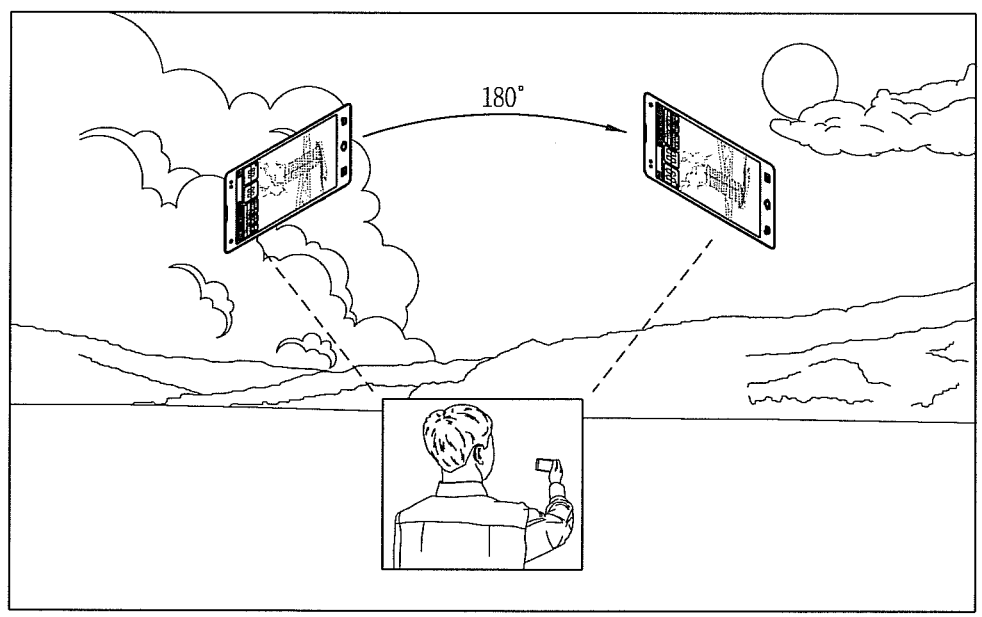
Figure 6C:
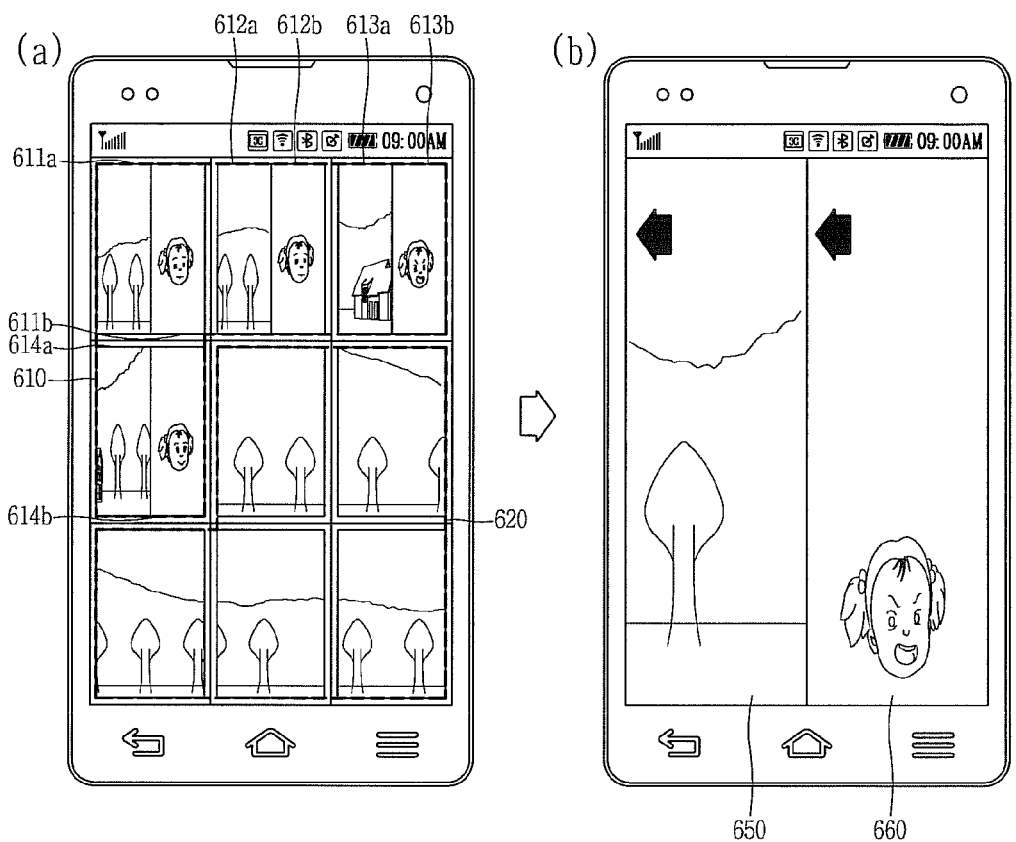

Referring to FIGS. 6A to 6C, a method is described below in which by moving the main body only within a predetermined reference range at the time of the panorama photographing, the landscape image and the multiple panorama pictures showing the changes in the facial expression of the user who views the landscape image are generated.

In association with this, FIGS. 6A to 6C are diagrams for describing the method in which the multiple panorama pictures are generated at the same time by moving the main body only within the predetermined reference range according to one embodiment of the present disclosure.

According to the embodiment of the present disclosure, when the panorama photographing mode is selected through the user input and the like, the controller 180 enters a preview screen of the first camera 121 arranged on the front side of the main body. Thereafter, a frame for guiding the user image (for example, a user's face) in such a manner that the user image is positioned on a predetermined region of the preview screen is displayed on the preview screen.

At this point, the frame is displayed in such a manner that a boundary line of the frame is drawn with a dotted line or a solid line to distinguish the frame from the other regions. In addition, the controller 180 outputs a highlighting effect or outputs a predetermined alarm sound through the audio output module 152 (refer to FIG. 1) until the user image is positioned in the corresponding frame.

For example, referring to FIG. 6A, when entering the preview screen through which the camera arranged on the front side of the mobile terminal performs the photographing, the controller 180 outputs a frame 640 in the shape of a rectangle on the right region of the display unit 151 in order to guide the user in such a manner that he/she appears within the corresponding frame 640. On the other hand, the image of the surrounding landscape that is viewed in advance through the camera arranged on the front side is displayed on the left region of the display unit 151.

At this point, the frame may be positioned on a region, different from the right region, of the display unit 151 (for example, the left region, or the upper/lower region) and the region to which the frame is output may be changed through the user input. In addition, a size of the frame can be enlarged or reduced through the user input.

In a state where the setting is performed in this manner, the controller 180 drives the second camera arranged on the rear side of the mobile terminal in such a manner that the second camera captures different images depending on the main body. In the panorama photographing mode, the sensing unit 140 senses the movement of the main body, and the controller 180 determines whether the extent to which the main body moves falls out of the predetermined reference range.

For example, referring to FIG. 6B, at least one 360-degrees panorama picture is generated by rotating the mobile terminal 100 by 180 degrees with the user serving as the central axis in a state where the user's face is positioned within the frame 640 on the preview screen of the first camera 121 arranged on the front side.

On the other hand, when the extent to which the main body moves falls out of the predetermined reference range, that is, when the initial image captured by the first camera 121 overlaps the current image captured by the second camera 122, the driving of the first and second cameras is stopped, and the images captured by the first camera 121 and the images captured by the second camera 122 are connected (or combined) to generate at least one panorama picture.

Specifically, the controller 180 connects the user images within the frame, captured by the first camera, and thus generates the first panorama picture. The controller combines the image outside of the frame, captured by the first camera, and the background image captured by the second camera to generate the second panorama picture.

For example, referring to FIG. 6C, as a result of the rotation illustrated in FIG. 6B, the controller 180 connects landscape images 611*a* to 614*a* outside of the frame 640, among images 610 captured by the first camera 121 arranged on the front side of the main body, and all landscape images 620 captured by the second camera 122 arranged on the rear side of the main body to generate one panorama picture 650. In addition, among the images 610 captured by the first camera 121, the controller 180 connects user images (for example, user's faces) 611*b* to 614*b* within the frame 640 to generate a 180-degrees panorama picture 660.

The 360-degrees panorama picture 650 and the 180-degrees panorama picture 660 that are generated in this manner are differently displayed on predetermined regions of the display unit 151, respectively. In a state where the panorama picture is displayed on the display unit 151 in this manner, the controller 180 rotates the panorama pictures 650 and 660 at a predetermined speed or rotates at a speed in inverse proportional to the number of images included in the panorama picture. In addition, at the time of the rotation of the panorama pictures 650 and 660, the controller 180 outputs the sound recorded through the microphone 123 while the images in the panorama pictures are captured.

The method is described above in which according to the embodiment of the present disclosure, the 180-degrees panorama picture is generated using the multiple cameras. From now on, a method is described in which the generated 360-degrees panorama picture is output to the display unit.

Figure 7B:
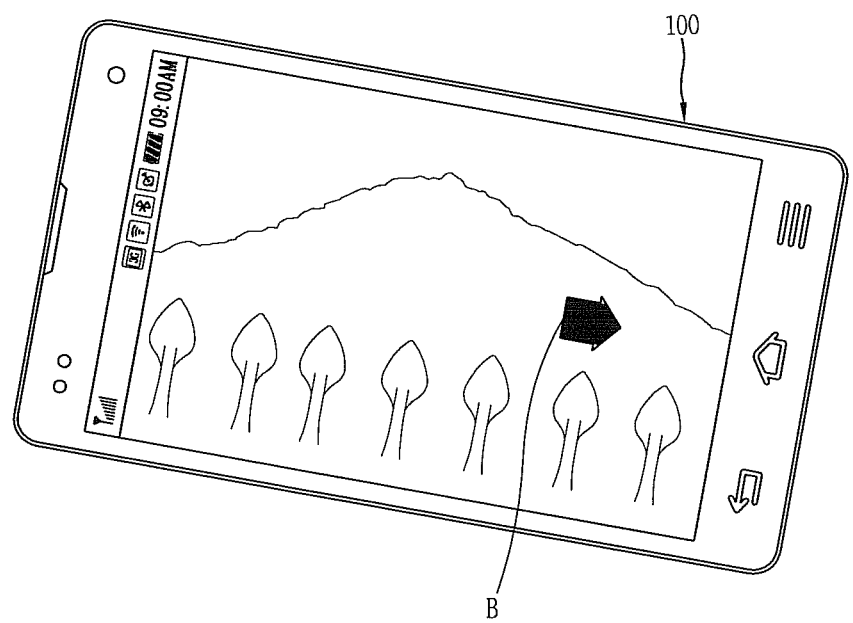
Figure 7C:
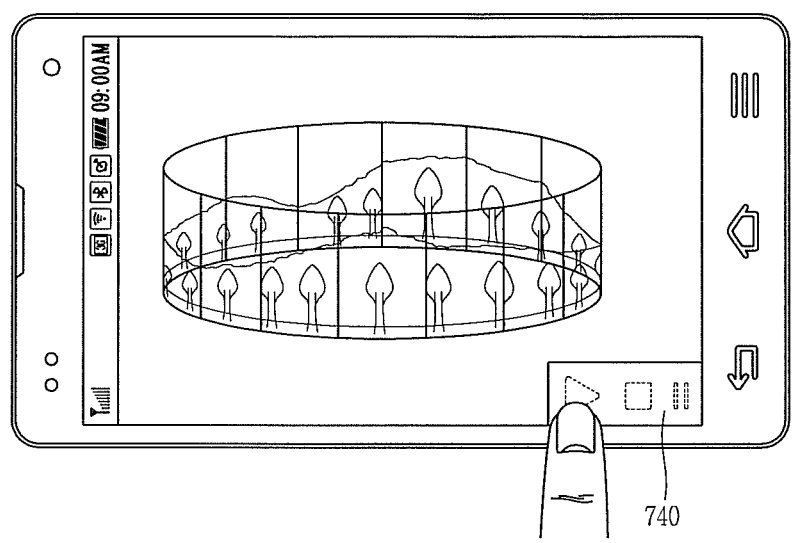

In association with this, FIGS. 7A to 7C are diagrams for describing the methods in each of which the 360-degrees panorama picture generated according to one embodiment of the present disclosure is output to the screen.

First, when the panorama photographing mode is selected through the user input and the like, the controller 180 drives the first and second cameras 121 and 122 at the same time in such a manner that the first and second cameras capture their respective images, depending on the movement of the main body. In the panorama photographing mode, the sensing unit 140 senses the movement of the main body, and the controller 180 determines whether the extent to which the main body moves falls out of the predetermined reference range. For example, if the panorama photographing mode is for the 360-degrees panorama photographing, when the initial image captured by the first camera 121 and the current image captured by the second camera 122 overlap each other, the controller 180 determines that the extent to which the main body moves falls out of the predetermined reference range.

When it is determined that the extent to which the main body moves falls out of the reference range, the controller 180 stops driving the first and second cameras, thereby ending the panorama photographing.

Thereafter, the images captured by the first camera 121 and the images captured by the second camera 122 are connected (or combined) to generate at least one panorama picture.

At least one 360-degrees panorama picture generated in this manner is output to the display unit 151 of the mobile terminal 100.

Based on the user input, for example, a panorama picture output command, the controller 180 controls the display unit 151 in such a manner that the generated panorama picture is output as a two-dimensional picture in a predetermined shape or is output as a three-dimensional picture in a predetermined shape.

At this point, the two-dimensional image in the predetermined shape means an image that is output in a planar shape on at least one region of the display unit 180. The three-dimensional image in the predetermined shape means an image that is output in a three-dimensional shape, such as a band shape, a spiral shape, a spherical shape, a polygonal shape, a cylindrical shape, and others, on at least one region of the display unit 180.

In a state where the panorama picture as the two-dimensional picture in the predetermined shape or the panorama picture as the three-dimensional picture in the predetermined shape is output to the display unit 151 in this manner, the controller 180 detects the touch input in one direction that is applied to the panorama picture that is output. When that touch input is detected, the controller 180 rotates the panorama picture at a speed corresponding to strength of the touch input along a direction of the touch input. That is, as illustrated, the panorama picture is rotated in the A-direction.

For example, referring to FIG. 7A, in a state where the generated 360-degrees panorama picture is output in a two-dimensional format to the display unit 151, the controller 180 detects the touch input in one direction, for example, a flicking touch input in the A-direction and rotates the panorama picture according to the detected input direction and touch strength. That is, the greater the touch strength of the flicking touch input, the faster the rotation speed, and the smaller the touch strength of the flicking touch input, the slower the rotation speed.

If the flicking touch input in the direction opposite to the rotational direction while rotating the panorama picture, the rotational speed is slower. In addition, if while rotating the panorama picture, a long touch input is applied to the panorama picture, or the touch input is applied a predetermined number of times, the rotation is stopped.

In addition, as illustrated in FIG. 7A, the time information, the location information, and the compass direction information that are obtained while capturing the corresponding image are displayed on one region of the 360-degrees panorama picture that is output to the display unit 151. When the panorama picture rotates and thus the image currently output to the display unit 151 is changed, the time information, the location information, and the compass direction information are accordingly changed.

In addition, in a state where the panorama picture as the two-dimensional picture in the predetermined shape or the panorama picture as the three-dimensional picture in the predetermined shape is output to the display unit 151 in this manner, the sensing unit 140 senses an inclination of the main body, and the controller 180 rotates the panorama picture along a direction of the inclination sensed by the sensing unit 140.

For example, referring to FIG. 7B, when a change in slope such as one resulting from the user inclining the main body in the B-direction is sensed, the 360-degrees panorama picture is output to the display unit 151 while rotating in the B-direction. At this point, when the user inclines the main body in the opposite direction, the panorama picture rotating in the B-direction is slower and slower and then comes to a stop and when the inclination in the opposite direction is maintained thereafter, the 360-degrees panorama picture is rotated in the corresponding direction. Although only the change in the inclination in the leftward/rightward direction is illustrated in FIG. 7B, in a case where the 360-degrees panorama picture is a lengthy picture in the upward/downward direction, the 360-degrees panorama picture can be rotated according to the changes in the inclination in the upward/downward direction.

In addition, when in a state where the panorama picture as the two-dimensional picture in the predetermined shape or the panorama picture as the three-dimensional picture in the predetermined shape is output to the display unit 151 in this manner, a reproduction function is selected, the controller 180 outputs the corresponding sound at the same time while rotating the panorama picture in one direction, until the images currently output to the display unit 151 appear again. At this point, for example, because a proximity touch is sensed, a menu bar for selecting the reproduction function may be output to one region of the display unit 151.

For example, referring to FIG. 7C, when in a state where the 360-degrees panorama picture as the three-dimensional picture in the cylindrical shape is output to the display unit 151, the proximity touch through the use of a user hand is sensed in a lower region of the display unit 151, a menu bar 740 relating to the reproduction of the corresponding panorama is displayed. When the reproduction function is selected from the displayed menu bar 740, the controller 180 displays the images in the 360-degrees panorama picture from a starting point to an ending point of photographing the 360-degrees panorama picture while automatically rotating them. At this point, synchronization with a reproduction speed varies based on the compass direction information obtained while performing the photographing. In addition, if the voice or sound that is recorded at the time of the photographing is included, the controller 180 outputs the corresponding voice or sound in accordance with the reproduction time. Furthermore, the controller 180 additionally displays an indication bar (for example, a scroll bar) for effectively displaying a lengthy image (for example, an axis image in the horizontal axis) in the 360-degrees panorama picture. In addition, thumbnail images for the images in the 360-degrees panorama picture are displayed in advance on one region, for example, on a lower region, of the display unit 151.

In addition, in a state where the panorama picture as the two-dimensional picture in the predetermined shape or the panorama picture as the three-dimensional picture in the predetermined shape is output to the display unit 151, the controller 180 detects a user gaze on the panorama picture that is output. To do this, an ultraviolet light sensor (not illustrated) and/or the camera 121 is used to sense a movement of the pupil of the user within a predetermined range with respect to the display unit 151. The controller 180 rotates the panorama picture that is displayed according to the user gaze that is sensed in this manner. For example, when the user gaze is transferred to the left, the panorama picture rotates to the left.

Figure 8:
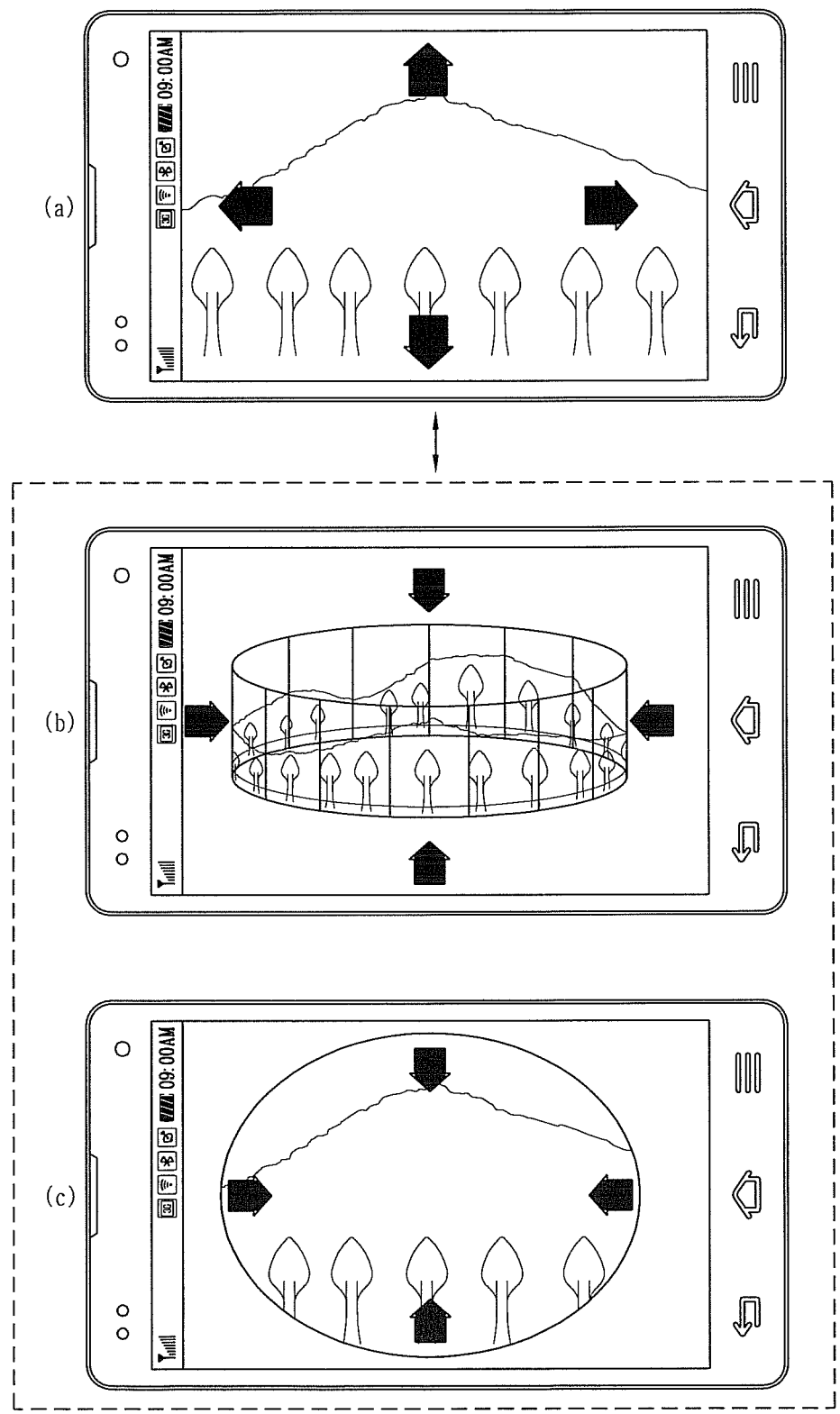
FIG. 8 shows diagrams for describing a method in which the 360-degrees panorama picture generated according to one embodiment of the present disclosure is converted into a two-dimensional picture or a three-dimensional picture.

FIG. 8 shows diagrams for describing a method in which the 360-degrees panorama picture generated according to one embodiment of the present disclosure is converted into the two-dimensional picture or the three-dimensional picture.

First, when the panorama photographing mode is selected through the user input and the like, the controller 180 drives the first and second cameras 121 and 122 at the same time in such a manner that the first and second cameras capture their respective images, depending on the movement of the main body. In the panorama photographing mode, the sensing unit 140 senses the movement of the main body, and the controller 180 determines whether the extent to which the main body moves falls out of the predetermined reference range. For example, if the panorama photographing mode is for the 360-degrees panorama photographing, when the initial image captured by the first camera 121 and the current image captured by the second camera 122 overlap each other, the controller 180 determines that the extent to which the main body moves falls out of the predetermined reference range.

When it is determined that the extent to which the main body moves falls out of the reference range, the controller 180 stops driving the first and second cameras, thereby ending the panorama photographing.

Thereafter, the images captured by the first camera 121 and the images captured by the second camera 122 are connected (or combined) to generate at least one panorama picture.

At least one 360-degrees panorama picture generated in this manner is output to the display unit 151 of the mobile terminal 100.

Based on the user input, for example, a panorama picture conversion command, the controller 180 outputs the panorama picture that is output as the two-dimensional picture in the predetermined shape, as the three-dimensional picture in the predetermined shape, or the panorama picture that is output as the three-dimensional picture in the predetermined shape, as the two-dimensional picture in the predetermined shape.

Specifically, when in a state where the panorama picture, as in the two-dimensional shape, is output to the display unit 151, a first touch input is sensed, the controller 180 changes the panorama shape of the panorama picture to the three-dimension and outputs the panorama picture in the predetermined three-dimensional shape.

In addition, when in a state where the panorama picture, as in the three-dimensional shape, is output to the display unit 151, a second touch input is sensed, the controller 180 changes the panorama shape of the panorama picture to the two-dimension and outputs the panorama picture in the predetermined two-dimensional shape. At this point, the first touch input and the second touch input may be multi-touches that are distinguishable from each other.

For example, as illustrated in FIG. 8(c), a zoom-out touch input is applied to the two-dimensional 360-degrees panorama picture that is output to the display unit 151, the controller 180 converts the panorama picture into the three-dimensional panorama picture. Specifically, if the panorama picture that is output is long only in horizontal axis, such a panorama picture, as illustrated in FIG. 8(b), is converted into the 360-degrees panorama picture as the three-dimensional picture in the cylindrical shape. If the panorama picture that is output is long both in horizontal axis and in vertical axis, such a panorama picture, as illustrated in FIG. 8(c), is converted into the 360-degrees panorama picture as the three-dimensional picture in the spherical shape. At this point, the three-dimensional pictures in the cylindrical and spherical shapes may be displayed, for example, with the rear side being opaque and the front side being translucent. In addition, when a double touch input is applied to a specific image in the 360-degrees panorama picture as the three-dimensional picture that results from the conversion, the controller 180 strikingly displays the corresponding image in such a manner as to enlarge only the corresponding image in the transverse and longitudinal directions.

On the other hand, when a zoom-in touch input is applied to the 360-degrees panorama picture as the three-dimensional picture illustrated in FIG. 8(a) or 8(c), the controller 180 converts the corresponding picture into the 360-degrees panorama picture as the two-dimensional picture.

Figure 9A:
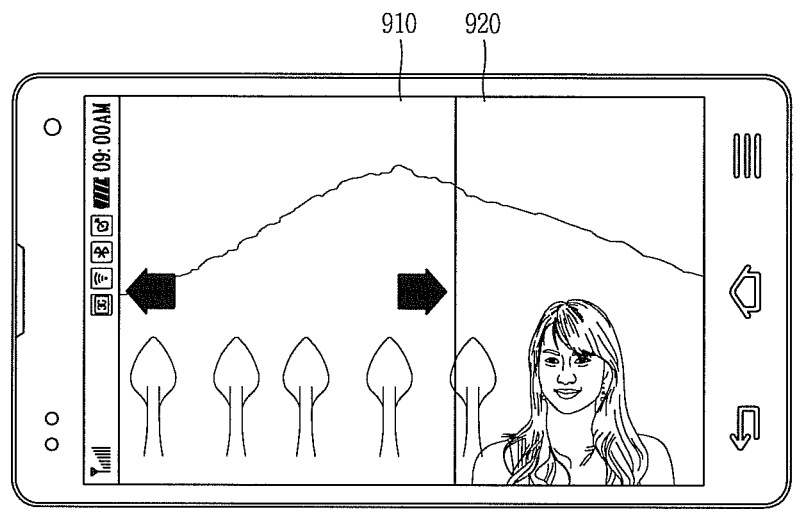
FIGS. 9A to 9C are diagrams for describing a method in which according to one embodiment of the present disclosure the multiple panorama pictures are output to the screen at the same time.
Figure 9B:
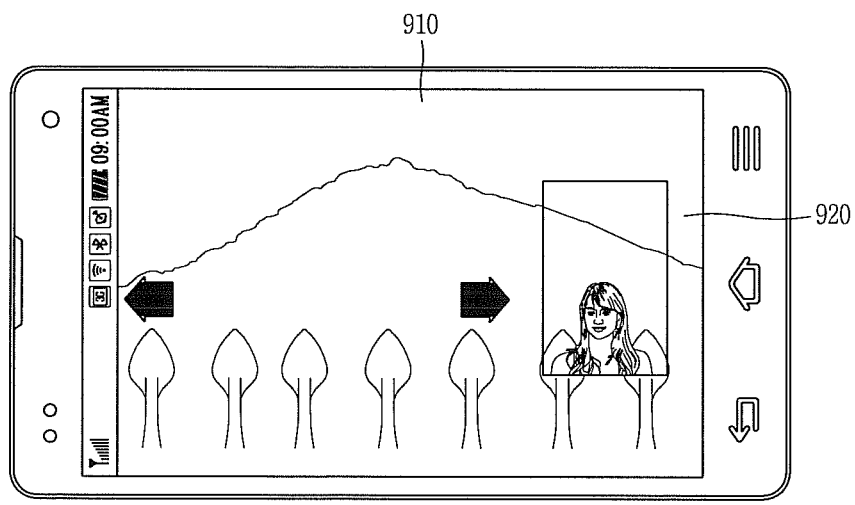
Figure 9C:
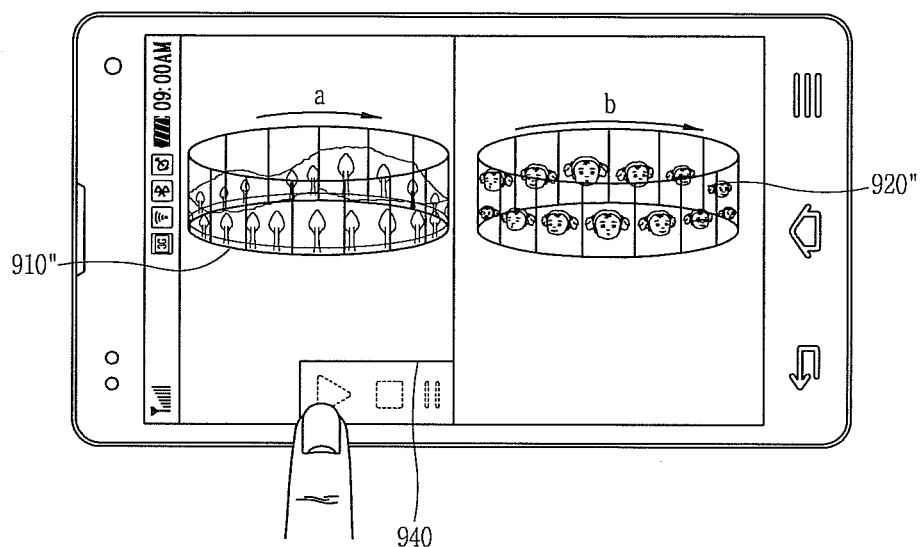

Referring to FIGS. 9A to 9C, a method is described in which the multiple 360-degrees panorama pictures generated according to one embodiment of the present disclosure are output to the display unit 151 at the same time and are controlled.

FIGS. 9A to 9C are diagrams for describing the method in which according to one embodiment of the present disclosure the multiple panorama pictures are output to the screen at the same time.

First, when the panorama photographing mode is selected through the user input and the like, the controller 180 enters the preview screen of the first camera 121 arranged on the front side of the main body. Thereafter, the frame for guiding the user image (for example, the user's face) in such a manner that the user image is positioned on the predetermined region of the preview screen is displayed on the preview screen.

In a state where the setting is performed in this manner, the controller 180 drives the second camera arranged on the rear side of the mobile terminal in such a manner that the second camera captures different images depending on the main body. In the panorama photographing mode, the sensing unit 140 senses the movement of the main body, and the controller 180 determines whether the extent to which the main body moves falls out of the predetermined reference range. For example, if the panorama photographing mode is for the 360-degrees panorama photographing, when the initial image captured by the first camera 121 and the current image captured by the second camera 122 overlap each other, the controller 180 determines that the extent to which the main body moves falls out of the predetermined reference range. When it is determined that the extent to which the main body moves falls out of the reference range, the controller 180 stops driving the first and second cameras, thereby ending the panorama photographing. Thereafter, the controller 180 connects the user images within the frame, captured by the first camera, and thus generates the first panorama picture. The controller combines the image outside of the frame, captured by the first camera, and the background image captured by the second camera to generate the second panorama picture.

The first 360-degrees panorama picture and the second 360-degrees panorama picture that are generated in this manner are output to the display unit 151 of the mobile terminal 100.

That is, the controller 180 connects the user images captured by the first camera 121 to generate the first panorama picture and outputs the generated first panorama picture to a first region of the display unit 151. The controller 180 connects the background images captured by the first and second cameras 121 and 122 to generate the second panorama picture and outputs the generated second panorama picture to a second region of the display unit 151.

At this point, the controller 180 outputs the first panorama picture that is output to the first region of the display unit 151, as the two-dimensional picture or the three-dimensional picture and outputs the second panorama picture that is output to the second region of the display unit 151, as the three-dimensional picture. In addition, the panorama pictures that are output to the first and second regions can be rotated according to the touch input applied to the panorama pictures, respectively and can be rotated according to the changes in the inclination of the main body. And the panorama pictures can be converted into the two-dimensional or three-dimensional picture according to a predetermined user input.

At this point, referring to FIGS. 9A and 9B, the first region and the second region may be upper and lower regions of the display unit 151 or as illustrated in FIG. 9A, may be left and right regions. Alternatively, as illustrated in FIG. 9B, one panorama picture can be output to another panorama picture, in the form of a floating window.

In addition, when in a state where the first panorama into which the images captured by the first camera 121 are combined is output to the first region of the display unit 151 and the second panorama into which the images captured by the first and second cameras 121 and 122 are combined is output to the second region of the display unit 151, the reproduction function is selected, the controller 180 rotates the first and second panorama pictures in one direction and output the corresponding sound at the same time until the images output currently displayed on the display unit 151 appears again.

At this point, even though the reproduction function is selected only with respect to the first panorama picture, the second panorama picture is rotated in such a manner as to correspond to the current image in the first panorama picture that is currently output to the display unit 151, the rotational direction and the rotational speed.

For example, referring to FIG. 9C, when in a state where a first 360-degrees panorama picture 910" is output to the left region of the display unit 151 and a second 360-degrees panorama picture 920" is output to the right region of the display unit 151, the proximity touch input is applied to a predetermined region of the first 360-degrees panorama picture 910", the controller 180 displays a menu bar 940 for reproducing the panorama picture and detects the touch input to a reproduction function key. When the reproduction function is accordingly executed, not only the first 360-degrees panorama picture 910" but also the second 360-degrees panorama picture 920", for example, clockwise rotates at a speed. On the other hand, even though the reproduction function is executed with respect to the second 360-degrees panorama picture 920", not only the second 360-degrees panorama picture 920" but also the first 360-degrees panorama picture 910" is automatically reproduced at the same time. On the other hand, if the user does not want to reproduce the first and second 360-degrees panorama pictures and 910" and 920" at the same time, he/she can stop reproducing either of them through a predetermined touch input to a menu bar 940 or the corresponding panorama picture.

Figure 10A:
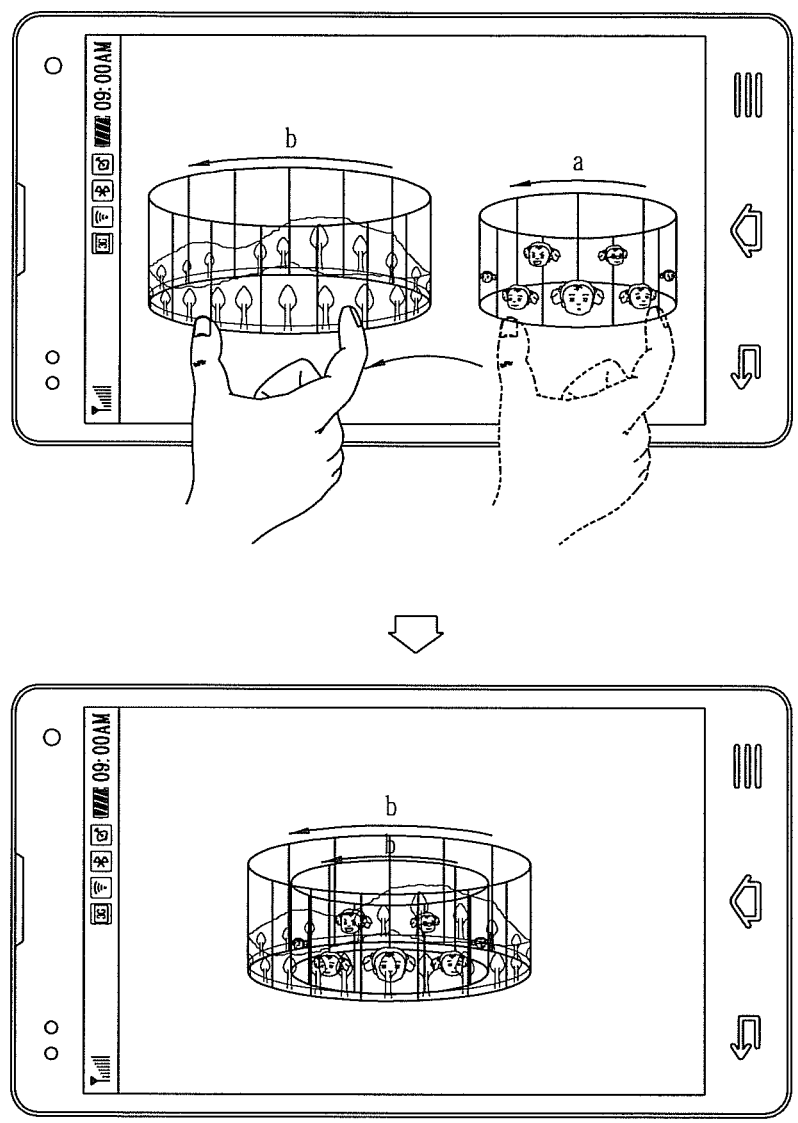

A method is described below in which the multiple 360-degrees panorama pictures are moved and displayed through the user gesture input. In association with this, FIGS. 10A to 10B are diagrams for describing the method in which a way to display the multiple panorama pictures is changed through the user gesture input according to one embodiment of the present disclosure.

First, when the panorama photographing mode is selected through the user input and the like, the controller 180 enters the preview screen of the first camera 121 arranged on the front side of the main body. Thereafter, the frame for guiding the user image (for example, the user's face) in such a manner that the user image is positioned on the predetermined region of the preview screen is displayed on the preview screen.

In a state where the setting is performed in this manner, the controller 180 drives the second camera arranged on the rear side of the mobile terminal in such a manner that the second camera captures different images depending on the main body. In the panorama photographing mode, the sensing unit 140 senses the movement of the main body, and the controller 180 determines whether the extent to which the main body moves falls out of the predetermined reference range. For example, if the panorama photographing mode is for the 360-degrees panorama photographing, when the initial image captured by the first camera 121 and the current image captured by the second camera 122 overlap each other, the controller 180 determines that the extent to which the main body moves falls out of the predetermined reference range. When it is determined that the extent to which the main body moves falls out of the reference range, the controller 180 stops driving the first and second cameras, thereby ending the panorama photographing. Thereafter, the controller 180 connects the user images within the frame, captured by the first camera to generate the first panorama picture. The controller combines the images outside of the frame, captured by the first camera, and the background images captured by the second camera to generate the second panorama picture.

The first 360-degrees panorama picture and the second 360-degrees panorama picture that are generated in this manner are output to the display unit 151 of the mobile terminal 100.

In response to the gesture input in which the first panorama picture is pushed down and then is dragged to the second panorama picture in a state where the first and second panorama pictures are output to the display unit 151, the controller 180 performs control in such a manner that the second panorama picture is output in such a manner that the second panorama picture is enlarged to the entire screen. And the controller 180 performs the control in such a manner that the first panorama picture is output in such a manner that the first panorama picture is positioned within the second panorama picture.

For example, as illustrated in FIG. 10A, if the user pushes down the first panorama picture in the three-dimensional cylindrical shape, into which the user images are connected, with his/her fingers and then drags it to the second panorama picture in the three-dimensional cylindrical shape, into which the landscape images are connected, the shape of the second panorama picture is output to all the regions of the display unit 151 and the first panorama picture is output in such a manner that the first panorama picture are positioned within the second panorama picture, that is, overlaps the second panorama. When the multiple panorama pictures overlap each other in this manner, the rotational direction and rotational speed of the first panorama picture are the same as those of the second panorama picture. In addition, additional information included in the first panorama picture, such as the compass direction information, the location information, and the like is moved to the second panorama picture and displayed on the second panorama picture.

On the other hand, in response to the gesture input in which the first panorama picture is pulled out of the second panorama picture within which the first panorama picture is positioned in such a manner as to overlap the second panorama picture, the controller 180 outputs the second panorama picture in such a manner that the second panorama picture is reduced in size and outputs the first panorama picture in such a manner that the first panorama picture is moved to a region corresponding to the gesture input.

For example, as illustrated in FIG. 10B, when the user applies the gesture input in which the first panorama picture in the three-dimensional cylindrical shape is pushed down and then is dragged out of the second panorama picture in the three-dimensional cylindrical, within which the first panorama picture in the three-dimensional shape is positioned, the controller 180 outputs the second panorama picture in such a manner that the shape of the second panorama picture is reduced back and outputs the first panorama picture in such a manner that the first panorama picture is moved to an ending point at which the gesture input is ended. At this point, the rotational direction and rotational direction of the pulled-out first panorama picture are the same as before, and the additional information on the first panorama picture, displayed on the second panorama picture, is displayed on the separated first panorama picture in such a manner as to overlap the separated first panorama picture.

In the mobile terminal according to the embodiment of the present disclosure and the method of control the mobile terminal, as described above, the cameras arranged on the front and rear sides of the main body are driven at the same time and the main body is rotated only within the predetermined range. Thus, the surrounding landscape and the facial expression of the user who views the surrounding landscape are captured into the panorama picture at the same time. In addition, user convenience is provided in that the generated 360-degrees panorama picture is reproduced on the display unit through the simple gesture input, and the multiple panorama pictures are output and are controlled at the same time.

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

With regard to the mobile terminal described above, the configuration and method of the embodiments described above are not given any limitation to their applications, and all of, or some of the embodiments can be selectively combined with each other in a manner that creates various modifications.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a main body;
   a first camera provided on a front side of the main body;
   a second camera provided on a rear side of the main body;
   a sensing unit that senses an extent of movement of the main body; and
   a controller that controls the first and second cameras to capture images as the main body is moved within a prescribed range,
      wherein the first camera is controlled to capture a plurality of first images as the main body is rotated within the prescribed range, and the second camera is controlled to capture a plurality of second image as the main body is rotated within the prescribed range,
      wherein, when the main body is moved beyond the prescribed range, the first and second camera are controlled to stop capturing images and the first plurality of images from the first camera and the plurality of second images from the second camera are connected to generate at least one panorama picture,
      wherein the prescribed range is a range of rotation of the main body in which an image captured by the second camera overlaps an initial image captured by the first camera, wherein, when a user image extraction function is selected, the controller is configured to remove a prescribed object from the generated panorama picture and to fill a region corresponding to the removed prescribed object using portions of images extracted from corresponding regions of the plurality of first or second images, and
      wherein the removed prescribed object is an image of a user in the plurality of first images captured by the first camera, and the portions of images used to fill the region occupied by the removed image is an image behind the image of the user that is extracted from preceding or following images among the plurality of first images.

2. The mobile terminal of claim 1, wherein the controller records a sound signal that is input through a microphone provided on the main body to correspond to the captured first and second plurality of images.

3. The mobile terminal of claim 1, wherein the prescribed range is a prescribed angular range, the first and second cameras being controlled to capture the first and second panorama images while the main body is rotated within the prescribed angular range.

4. The mobile terminal of claim 1,
   wherein, when a panorama photographing mode is selected, the sensing unit senses the movement of the main body in a circular motion about a user serving as a central axis, and
   wherein, when an angle corresponding to the movement of the main body exceeds a reference angle, the controller controls the first and second cameras to stop capturing images and connects the plurality of first images captured by the first camera to generate a first panorama picture and connects the plurality of second images captured by the second camera to generate a second panorama picture.

5. The mobile terminal of claim 4, wherein, when the panorama photographing mode is selected, the controller controls a display of a preview screen for the first camera and displays a frame that guides positioning of a user image in a prescribed region on the preview screen.

6. The mobile terminal of claim 5, wherein the controller connects user images within the frame from the plurality of first images to generate the first panorama image, and combines images outside of the frame from the plurality of first images captured by the first camera and the plurality of second images captured by the second camera to generate the second panorama image.

7. The mobile terminal of claim 1, wherein the controller displays time information, and position and direction information that are obtained while the first and second cameras capture their respective images corresponding to the movement of the main body, the time, position and direction information being displayed on the plurality of first and second images to overlap the first and second images.

8. The mobile terminal of claim 1, further comprising:
a display configured to display the generated panorama picture,
wherein, based on a user input, the controller controls the display to output the generated panorama picture as a two-dimensional picture in a prescribed shape or a three-dimensional picture in a prescribed shape.

9. The mobile terminal of claim 8,
wherein, when a first touch input is sensed while the panorama picture is displayed as the two-dimensional picture, the controller changes the panorama picture to the three-dimensional picture in the prescribed shape and controls to display the resulting three-dimensional picture on the display, and
wherein, when a second touch input is sensed while the panorama picture is displayed as the three-dimensional picture, the controller changes the panorama picture to the two-dimensional picture in the prescribed shape and controls to display the resulting two-dimensional picture on the display.

10. The mobile terminal of claim 8, wherein,
when the sensing unit senses an inclination of the main body while the panorama picture is displayed on the display, the controller rotates the panorama picture according to a direction of the sensed inclination, and
when a touch input in a prescribed direction is sensed on the panorama picture while the panorama picture is displayed on the display, the controller rotates the panorama picture in the prescribed direction at a speed corresponding to the touch input.

11. The mobile terminal of claim 8, wherein, when a reproduction function is selected while the panorama picture is displayed on the display, the controller rotates the panorama picture in a prescribed direction and concurrently outputs a sound corresponding to the panorama picture.

12. The mobile terminal of claim 11, wherein, when a first and second panorama pictures are displayed and the reproduction function is selected with respect to the first panorama picture, the controller rotates the second panorama picture to corresponds to the first panorama picture in a currently displayed image, a rotational direction and a rotational speed.

13. The mobile terminal of claim 8, wherein the displaying is divided into a first region and a second region, and wherein the controller outputs a first panorama picture generated by connecting user images captured by the first camera to the first region, and outputs a second panorama picture generated by connecting background images captured by the first and second cameras to the second region.

14. The mobile terminal of claim 13, wherein the controller outputs the first panorama picture as a two-dimensional picture or a three-dimensional picture and outputs the second panorama picture as a three-dimensional picture to the second region.

15. The mobile terminal of claim 14, wherein, in response to a gesture input in which the first panorama picture is pushed down and then dragged to the second panorama picture, the controller controls the second panorama picture to be displayed enlarged and controls display of the first panorama picture to be positioned within the second panorama picture.

16. The mobile terminal of claim 14, wherein, in response to a gesture input in which the first panorama picture is pulled out from the second panorama picture within which the first panorama picture is positioned, the controller controls the display of the second panorama picture to be reduced in size and controls the display of the first panorama picture to be moved to a region corresponding to the gesture input.

17. A method of controlling a mobile terminal having a first and second cameras provided on front and rear sides of a main body, comprising:
controlling a first and a second cameras to concurrently capture a plurality of images while a main body of a mobile terminal is rotated within a prescribed range;
controlling the first and second cameras to stop capturing images when the rotation of the main body exceeds the prescribed range, the prescribed range extending to a point in which an initial image captured by the first camera and a current image captured by the second camera overlap each other;
connecting the images captured by the first camera and the images captured by the second camera to generate at least one panorama picture,
wherein the prescribed range is a range of rotation of the main body in which an image captured by the second camera overlaps an initial image captured by the first camera,
wherein, when a user image extraction function is selected, the controller is configured to remove a prescribed object from the generated panorama picture and to fill a region corresponding to the removed prescribed object using portions of images extracted from corresponding regions of the plurality of first or second images, and
wherein the removed prescribed object is an image of a user in the plurality of first images captured by the first camera, and the portions of images used to fill the region occupied by the removed image is an image behind the image of the user that is extracted from preceding or following images among the plurality of first images.

* * * * *